US009842313B2

(12) United States Patent
B'Far et al.

(10) Patent No.: US 9,842,313 B2
(45) Date of Patent: Dec. 12, 2017

(54) EMPLOYEE WELLNESS TRACKING AND RECOMMENDATIONS USING WEARABLE DEVICES AND HUMAN RESOURCE (HR) DATA

(71) Applicant: ORACLE INTERNATIONAL CORPORATION, Redwood Shores, CA (US)

(72) Inventors: Reza B'Far, Huntington Beach, CA (US); Elizabeth Lingg, Pleasanton, CA (US); Kent Spaulding, Portland, OR (US); Malini Chakrabarti, Cliffside Park, NJ (US); Christopher Leone, Pleasanton, CA (US)

(73) Assignee: Oracle International Corporation, Redwood Shores, CA (US)

(*) Notice: Subject to any disclaimer, the term of this patent is extended or adjusted under 35 U.S.C. 154(b) by 123 days.

(21) Appl. No.: 14/199,143

(22) Filed: Mar. 6, 2014

(65) Prior Publication Data

US 2015/0220883 A1     Aug. 6, 2015

Related U.S. Application Data

(60) Provisional application No. 61/936,556, filed on Feb. 6, 2014.

(51) Int. Cl.
*G06F 17/00* (2006.01)
*G06Q 10/10* (2012.01)

(52) U.S. Cl.
CPC ................. *G06Q 10/105* (2013.01)

(58) Field of Classification Search
CPC .................................................. G06Q 10/105
See application file for complete search history.

(56) References Cited

U.S. PATENT DOCUMENTS

| 2002/0017994 A1* | 2/2002 | Balkin | A61B 5/16 340/573.1 |
|---|---|---|---|
| 2010/0016742 A1* | 1/2010 | James | A61B 5/02405 600/509 |

(Continued)

OTHER PUBLICATIONS

Lingg, E., et al. "Cardea: Cloud Based Employee Health and Wellness: Integrated Wellness Application with a Wearable Device and the HCM Data Store", Date Unknown, 6 pages.

(Continued)

*Primary Examiner* — Dmitry Suhol
*Assistant Examiner* — Carl V Larsen
(74) *Attorney, Agent, or Firm* — Kilpatrick Townsend and Stockton LLP

(57) ABSTRACT

Embodiments of the invention provide systems and methods for wellness tracking and recommendations. More specifically, embodiments of the present invention provide wellness applications that integrate wearable devices with Human Resource (HR) and other enterprise application data. According to one embodiment, providing integrated wellness information can comprise retrieving enterprise application data from one or more data sources, retrieving data from one or more wearable devices of one or more employees, and applying analytics to the retrieved enterprise application data and the data retrieved from the wearable devices. The integrated wellness information can be generated based on the applied analytics and can be provided to the one or more employees through a user interface.

19 Claims, 15 Drawing Sheets

(56) References Cited

U.S. PATENT DOCUMENTS

| | | | | |
|---|---|---|---|---|
| 2010/0100427 | A1* | 4/2010 | McKeown | G06Q 10/067 705/322 |
| 2011/0288876 | A1* | 11/2011 | Cardillo | G06Q 10/10 705/2 |
| 2012/0203464 | A1* | 8/2012 | Mollicone | G06Q 10/0639 702/19 |
| 2012/0244504 | A1* | 9/2012 | Wasserman | G09B 19/00 434/238 |
| 2013/0013327 | A1* | 1/2013 | Horseman | G06F 19/3418 705/1.1 |
| 2013/0041290 | A1* | 2/2013 | Kording | A61B 5/1101 600/595 |
| 2013/0196297 | A1* | 8/2013 | Anwar | G06F 19/3475 434/236 |
| 2014/0073486 | A1* | 3/2014 | Ahmed | A61B 5/02405 482/9 |
| 2014/0085077 | A1* | 3/2014 | Luna | G08B 6/00 340/539.11 |
| 2014/0085101 | A1* | 3/2014 | Rahman | A61B 5/0022 340/870.01 |
| 2014/0089836 | A1* | 3/2014 | Damani | G06F 19/3418 715/771 |
| 2014/0278629 | A1* | 9/2014 | Stephenson | G06Q 10/1091 705/7.13 |
| 2014/0302470 | A1* | 10/2014 | Zapantis | G09B 19/00 434/236 |
| 2015/0066686 | A1* | 3/2015 | Hoch | G06N 3/006 705/26.7 |

OTHER PUBLICATIONS

Author Unknown, "Quantified Self", Wikipedia, Retrieved from http://en.wikipedia.org/wiki/Quantified_Self on Jul. 2, 2014, 10 pages.

Author Unknown, "Workplace Wellness", Wikipedia, Retrieved from http://en.wikipedia.org/wiki/Workplace_Wellness on Jul. 2, 2014, 11 pages.

Author Unknown, "Health and Work-Life Balance are key values at many Top Workplaces", San Jose Mercury News, Jun. 18, 2013, Retrieved from http://www.mercurynews.com/topworkplaces/ci_23462004/health-and-work-life-balance-are-key-values on Jul. 2, 2014, 10 pages.

Finley, K., "What if your boss tracked your sleep, diet, and exercise?", Wired.com, Apr. 17, 2013, Retrieved from http://www.wired.com/wiredenterprise/2013/04/quantified-work-citizen on Jul. 2, 2014, 5 pages.

Wilson, H. J., "Wearables in the Workplace", Harvard Business Review, Sep. 2013, Retrieved from http://hbr.org/2013/09/wearables-in-the-workplace on Jul. 2, 2014, 7 pages.

Bassett, D. R. Jr., et al. "Pedometer-measured physical activity and health behaviors in U.S. adults", Med Sci Sports Exercise, Oct. 2010, vol. 42, Issue 10, pp. 1819-1825.

Bates, S. J. et al. "Formulation of the Audze-Eglais Uniform Latin Hypercube design of experiments", Advances in Engineering Software, vol. 34, 2003, pp. 493-506.

* cited by examiner

FIG. 8

Activity | Sleep

Your sleep deficit for the last 7 Days is 1 minutes ~1105

Bed Time ~1110

Calculate my bed time:

My ideal sleep duration Hrs: 8 ▷  Mins: 45 ▷ ~1115

My wake up time Hrs: 6 ▷  Mins: 00 ▷  AM ▷ ~1120

Calculate Bed Time

You shall go to bed at 8:48 PM ~1125

FIG. 11

Project Comparator

| Occupation/ Project | Average Sleep Quality | Average Sleep Time (hours) | Average Awake Time (minutes) | Average Bed Time (hours) | Quality |
|---|---|---|---|---|---|
| Operation | 93 | 8 | 20 | 8 | |
| Accounting | 92 | 7 | 38 | 8 | |
| Data Analytics | 90 | 7 | 18 | 8 | |
| Project Management | 90 | 8 | 37 | 9 | |
| Report | 88 | 7 | 49 | 8 | |
| Software Development | 84 | 7 | 20 | 7 | |
| Marketing | 83 | 7 | 35 | 8 | |

FIG. 14

EMPLOYEE WELLNESS TRACKING AND RECOMMENDATIONS USING WEARABLE DEVICES AND HUMAN RESOURCE (HR) DATA

CROSS-REFERENCES TO RELATED APPLICATIONS

The present application claims benefit under 35 USC 119(e) of U.S. Provisional Application No. 61/936,556, filed on Feb. 6, 2014 by B'Far et al. and entitled "Employee Wellness Tracking and Recommendations Using Wearable Devices and Human Resource (HR) Data," of which the entire disclosure is incorporated herein by reference for all purposes.

BACKGROUND OF THE INVENTION

Embodiments of the present invention relate generally to methods and systems for wellness tracking and recommendations and more particularly to wellness applications that integrate wearable devices with Human Resource (HR) and other enterprise application data.

Activity Tracking and applications have been gaining a lot of attention recently. The practice of applying data analytics to get quantified feedback and thus change behavior has become widespread over many different work regions. This is partly driven by the "Quantified Self" movement which uses technology to collect data from a person's daily life, followed by visualization, cross-referencing, and discovering correlations. This is also driven by the employers' increasing support for the "workplace wellness," which aims to improve the health outcomes of employees.

More and more devices focusing on personal health and wellness tracking have been emerging on the market. Wearable devices use sensors such as accelerometers, which measure the change in velocity, to determine device positions, speed of movement, and distance moved. Activity levels can be detected using the accelerometer, as well as sleep, since small movements can be used to detect that the human body is at rest. Pedometers are also used, which may be a separate sensor or integrated with the accelerometer. Pedometers measure the number of steps by looking at the change in position without respect to speed or intensity. Also, these devices use heart rate sensors, which contain LED's emitting light in pulses and use the reflection of light on the skin to detect blood flow and therefore heart rate.

Additionally, in physical working areas, companies are analyzing the data from wearable devices to help improve efficiency and work safety. However, current applications do not leverage the data from Human Resource (HR) applications or other enterprise application and Fitness Tracking devices in order to make recommendations to employees about wellness. Hence, there is a need for improved methods and systems for wellness applications that integrate wearable devices with Human Resource (HR) and other enterprise application data.

BRIEF SUMMARY OF THE INVENTION

Embodiments of the invention provide systems and methods for wellness tracking and recommendations. More specifically, embodiments of the present invention provide wellness applications that integrate wearable devices with Human Resource (HR) and other enterprise application data. According to one embodiment, providing integrated wellness information can comprise retrieving enterprise application data from one or more data sources, retrieving data from one or more wearable devices of one or more employees, and applying analytics to the retrieved enterprise application data and the data retrieved from the wearable devices. The integrated wellness information can be generated based on the applied analytics and can be provided to the one or more employees through a user interface.

For example, generating the integrated wellness information based on the applied analytics can comprise generating comparative activity level information between employees and statistical activity information. Additionally or alternatively, generating the integrated wellness information based on the applied analytics comprises generating an activity leader board illustrating activity levels between employees. In another example, generating the integrated wellness information based on the applied analytics can comprise generating a set of sedentary metrics, evaluations, and recommendations. In some cases, generating the integrated wellness information based on the applied analytics can additionally or alternatively comprise one or more of generating a score for stress level, generating a sleep quality score and sleep trends, generating sleep quality scores for an employee correlated to factors impacting sleep, generating correlations between sleep scores and performance scores for an employee, generating sleep quality metrics for an employee categorized by project type assigned to the employee, and/or generating sleep metrics for an employee categorized by location.

According to one embodiment, any of these metrics as well as others can be used in combination and relative to one or more goals. For example, generating the integrated wellness information based on the applied analytics can comprise generating one or more work-life balance and wellness metrics relative to a set of user defined goals and one or more recommendations to achieve the user defined goals. In another example, generating the integrated wellness information based on the applied analytics can comprise generating one or more wellness metrics relative to a set of organization defined wellness goals of a wellness program and one or more recommendations to achieve the organization defined wellness goals.

BRIEF DESCRIPTION OF THE DRAWINGS

FIG. 8 is a screenshot illustrating an exemplary user interface for providing integrated sedentary lifestyle analysis information according to one embodiment of the present invention.

FIG. 11 is a screenshot illustrating an exemplary user interface for providing a bedtime calculator according to one embodiment of the present invention.

FIG. 14 is a screenshot illustrating an exemplary user interface for providing a project comparator in relation to sleep according to one embodiment of the present invention.

DETAILED DESCRIPTION OF THE INVENTION

Figure 1:
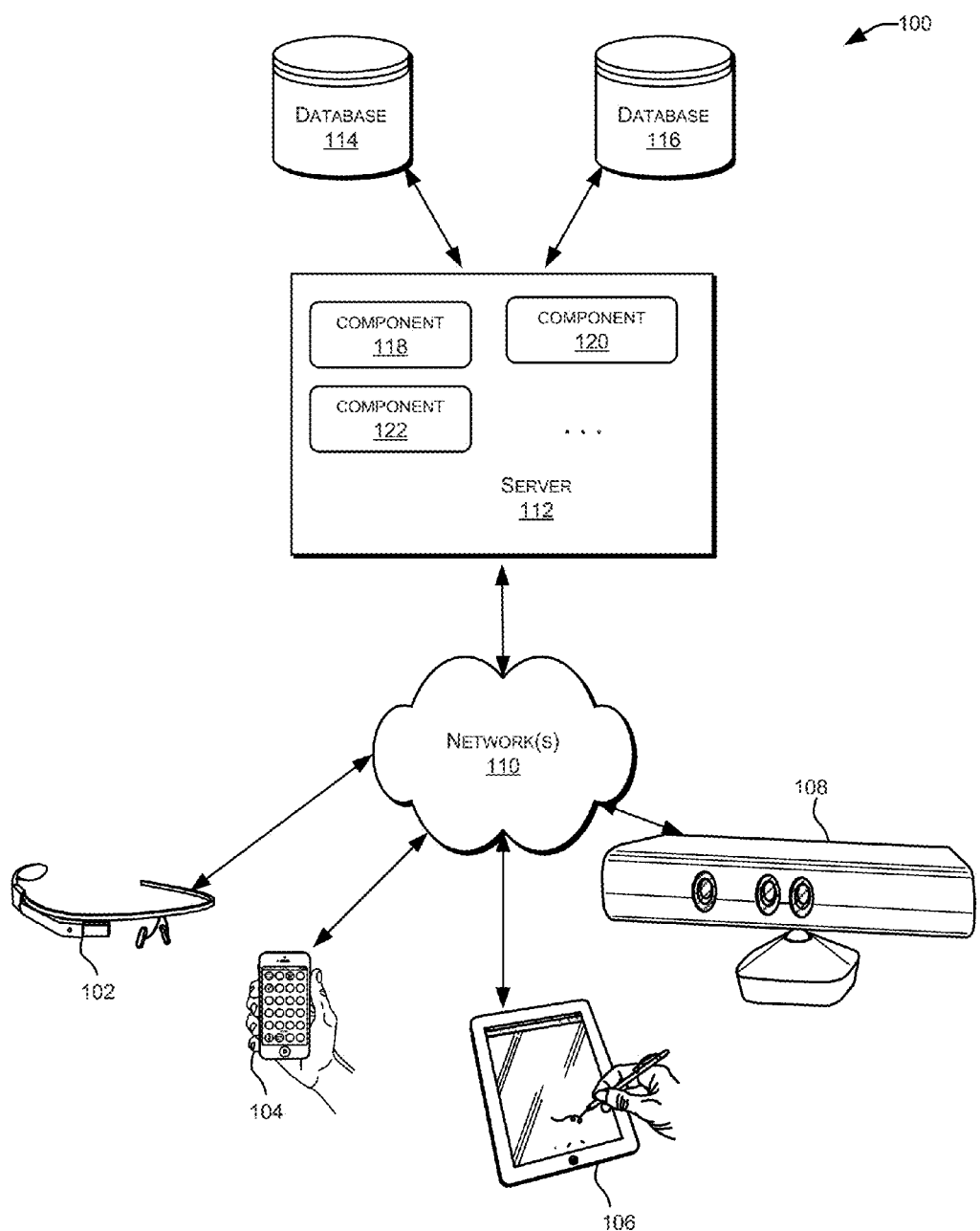
FIG. 1 is a block diagram illustrating components of an exemplary distributed system in which various embodiments of the present invention may be implemented.

In the following description, for the purposes of explanation, numerous specific details are set forth in order to provide a thorough understanding of various embodiments of the present invention. It will be apparent, however, to one skilled in the art that embodiments of the present invention may be practiced without some of these specific details. In other instances, well-known structures and devices are shown in block diagram form.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "machine-readable medium" includes, but is not limited to portable or fixed storage devices, optical storage devices, and various other mediums capable of storing, containing or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Embodiments of the invention provide systems and methods for providing wellness tracking and recommendations. More specifically, embodiments of the present invention provide wellness applications that sync with a wearable device and with a human capital management database or other enterprise application data to provide a full picture of health and wellness. Wellness can be measured at the individual level as well as at the group level. More specifically, embodiments of the present invention provide an integrated application that can combine data from users' wearable devices with data from an Human Capital Management (HCM) data store and can then store the data in a semantic graph. Reasoning, or algorithmic analysis, then can be performed over the stored semantic data. Users can then use this data to evaluate their behavior and perhaps use it to improve their physical well-being.

This integrated application can connect (via connectors built to conform to a framework) to a company's enterprise systems, for example, HCM applications, project management applications, and other enterprise applications, and can pull information from those sources into a semantic database. The semantic database can maintain information about employees' projects, their travel dates and locations, hours worked, etc. The connectors also pull the data from each employee's fitness tracker's cloud service (with the employee's permission, of course). Connectors can be built to pull data from any device manufacturer who makes a cloud service API available.

Embodiments of the present invention can use the semantic database to provide activity dashboards to the user, where they can look to see how active they are relative to other employees, the average person matching their age, gender, and profession, and so on. If the device supports sleep tracking, dashboards may provide information about sleep habits and algorithms can provide recommendations on how much sleep to get. Various use-cases of such embodiments include but are not limited to: providing a measure of activity and fitness levels shown on a corporate leaderboard; providing a dashboard of most active and least active days of the week; provide a dashboard of "sedentary time" versus "active time" (based on health studies and their definitions of sedentary—time period be varied from hours to days to weeks); provide a dashboard measuring a "stress score" over some period of time with stress scores possibly shown as they relates to activity level and sleep patterns; provide anonymized comparisons against people of the same age, gender, region, BMI, job title, organization, project type(s), and salary range; provide customized recommendations for improvement; provide analysis of sleep patterns, including bed time, wake time, sleep duration, and sleep quality; provide a dashboard of quality of sleep per day, based on historical data; calculate sleep deficit and optimal bed times; provide a correlation model for sleep vs. stress level, activity level, caffeine consumption, etc.; provide a correlation model for sleep quality versus project types, organization, job title, and job performance; and/or provide measures of stress score and sleep quality while traveling to different locations, etc. An integrated UI provided by the application can present each of these use-cases to the user. Various additional details of embodiments of the present invention will be described below with reference to the figures.

FIG. 1 is a block diagram illustrating components of an exemplary distributed system in which various embodiments of the present invention may be implemented. In the illustrated embodiment, distributed system 100 includes one or more client computing devices 102, 104, 106, and 108, which are configured to execute and operate a client application such as a web browser, proprietary client (e.g., Oracle Forms), or the like over one or more network(s) 110. Server 112 may be communicatively coupled with remote client computing devices 102, 104, 106, and 108 via network 110.

In various embodiments, server 112 may be adapted to run one or more services or software applications provided by one or more of the components of the system. In some embodiments, these services may be offered as web-based or cloud services or under a Software as a Service (SaaS) model to the users of client computing devices 102, 104, 106, and/or 108. Users operating client computing devices 102, 104, 106, and/or 108 may in turn utilize one or more client applications to interact with server 112 to utilize the services provided by these components.

In the configuration depicted in the figure, the software components 118, 120 and 122 of system 100 are shown as being implemented on server 112. In other embodiments, one or more of the components of system 100 and/or the services provided by these components may also be implemented by one or more of the client computing devices 102, 104, 106, and/or 108. Users operating the client computing devices may then utilize one or more client applications to use the services provided by these components. These components may be implemented in hardware, firmware, software, or combinations thereof. It should be appreciated that various different system configurations are possible, which may be different from distributed system 100. The embodiment shown in the figure is thus one example of a distributed system for implementing an embodiment system and is not intended to be limiting.

Client computing devices 102, 104, 106, and/or 108 may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like, and being Internet, e-mail, short message service (SMS), Blackberry®, or other communication protocol enabled. The client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices 102, 104, 106, and 108 may be any other electronic device, such as a thin-client computer, an Internet-enabled gaming system (e.g., a Microsoft Xbox gaming console with or without a Kinect® gesture input device), and/or a personal messaging device, capable of communicating over network(s) 110.

Although exemplary distributed system 100 is shown with four client computing devices, any number of client computing devices may be supported. Other devices, such as devices with sensors, etc., may interact with server 112.

Network(s) 110 in distributed system 100 may be any type of network familiar to those skilled in the art that can support data communications using any of a variety of commercially-available protocols, including without limitation TCP/IP (transmission control protocol/Internet protocol), SNA (systems network architecture), IPX (Internet packet exchange), AppleTalk, and the like. Merely by way of example, network(s) 110 can be a local area network (LAN), such as one based on Ethernet, Token-Ring and/or the like. Network(s) 110 can be a wide-area network and the Internet. It can include a virtual network, including without limitation a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol); and/or any combination of these and/or other networks.

Server 112 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. In various embodiments, server 112 may be adapted to run one or more services or software applications described in the foregoing disclosure. For example, server 112 may correspond to a server for performing processing described above according to an embodiment of the present disclosure.

Server 112 may run an operating system including any of those discussed above, as well as any commercially available server operating system. Server 112 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 112 may include one or more applications to analyze and consolidate data feeds and/or event updates received from users of client computing devices 102, 104, 106, and 108. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 112 may also include one or more applications to display the data feeds and/or real-time events via one or more display devices of client computing devices 102, 104, 106, and 108.

Distributed system 100 may also include one or more databases 114 and 116. Databases 114 and 116 may reside in a variety of locations. By way of example, one or more of databases 114 and 116 may reside on a non-transitory storage medium local to (and/or resident in) server 112. Alternatively, databases 114 and 116 may be remote from server 112 and in communication with server 112 via a network-based or dedicated connection. In one set of embodiments, databases 114 and 116 may reside in a storage-area network (SAN). Similarly, any necessary files for performing the functions attributed to server 112 may be stored locally on server 112 and/or remotely, as appropriate. In one set of embodiments, databases 114 and 116 may include relational databases, such as databases provided by Oracle, that are adapted to store, update, and retrieve data in response to SQL-formatted commands.

Figure 2:
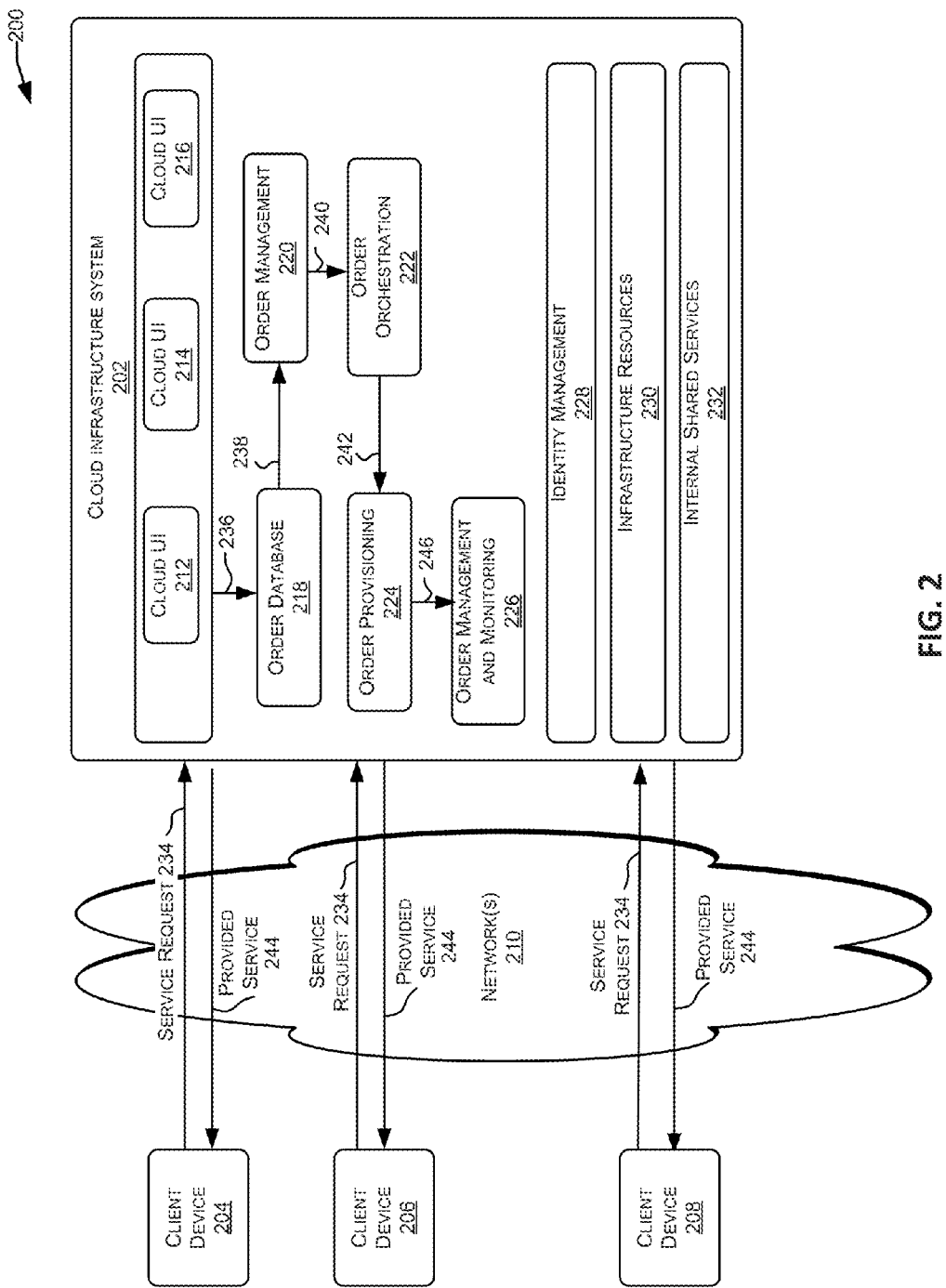
FIG. 2 is a block diagram illustrating components of a system environment by which services provided by embodiments of the present invention may be offered as cloud services.

FIG. 2 is a block diagram illustrating components of a system environment by which services provided by embodiments of the present invention may be offered as cloud services. In the illustrated embodiment, system environment 200 includes one or more client computing devices 204, 206, and 208 that may be used by users to interact with a cloud infrastructure system 202 that provides cloud services. The client computing devices may be configured to operate a client application such as a web browser, a proprietary client application (e.g., Oracle Forms), or some other application, which may be used by a user of the client computing device to interact with cloud infrastructure system 202 to use services provided by cloud infrastructure system 202.

It should be appreciated that cloud infrastructure system 202 depicted in the figure may have other components than those depicted. Further, the embodiment shown in the figure is only one example of a cloud infrastructure system that may incorporate an embodiment of the invention. In some other embodiments, cloud infrastructure system 202 may have more or fewer components than shown in the figure, may combine two or more components, or may have a different configuration or arrangement of components.

Client computing devices 204, 206, and 208 may be devices similar to those described above for 102, 104, 106, and 108.

Although exemplary system environment 200 is shown with three client computing devices, any number of client computing devices may be supported. Other devices such as devices with sensors, etc. may interact with cloud infrastructure system 202.

Network(s) 210 may facilitate communications and exchange of data between clients 204, 206, and 208 and cloud infrastructure system 202. Each network may be any type of network familiar to those skilled in the art that can support data communications using any of a variety of commercially-available protocols, including those described above for network(s) 110.

Cloud infrastructure system 202 may comprise one or more computers and/or servers that may include those described above for server 112.

In certain embodiments, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 202 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

In various embodiments, cloud infrastructure system 202 may be adapted to automatically provision, manage and track a customer's subscription to services offered by cloud infrastructure system 202. Cloud infrastructure system 202 may provide the cloud services via different deployment models. For example, services may be provided under a public cloud model in which cloud infrastructure system 202 is owned by an organization selling cloud services (e.g., owned by Oracle) and the services are made available to the general public or different industry enterprises. As another example, services may be provided under a private cloud model in which cloud infrastructure system 202 is operated solely for a single organization and may provide services for one or more entities within the organization. The cloud services may also be provided under a community cloud model in which cloud infrastructure system 202 and the services provided by cloud infrastructure system 202 are shared by several organizations in a related community. The cloud services may also be provided under a hybrid cloud model, which is a combination of two or more different models.

In some embodiments, the services provided by cloud infrastructure system 202 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 202. Cloud infrastructure system 202 then performs processing to provide the services in the customer's subscription order.

In some embodiments, the services provided by cloud infrastructure system 202 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by the cloud infrastructure system via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 202 may also include infrastructure resources 230 for providing the resources used to provide various services to customers of the cloud infrastructure system. In one embodiment, infrastructure resources 230 may include pre-integrated and optimized combinations of hardware, such as servers, storage, and networking resources to execute the services provided by the PaaS platform and the SaaS platform.

In some embodiments, resources in cloud infrastructure system 202 may be shared by multiple users and dynamically re-allocated per demand. Additionally, resources may be allocated to users in different time zones. For example, cloud infrastructure system 230 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 232 may be provided that are shared by different components or modules of cloud infrastructure system 202 and by the services provided by cloud infrastructure system 202. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 202 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 202, and the like.

In one embodiment, as depicted in the figure, cloud management functionality may be provided by one or more modules, such as an order management module 220, an order orchestration module 222, an order provisioning module 224, an order management and monitoring module 226, and an identity management module 228. These modules may include or be provided using one or more computers and/or servers, which may be general purpose computers, specialized server computers, server farms, server clusters, or any other appropriate arrangement and/or combination.

In exemplary operation 234, a customer using a client device, such as client device 204, 206 or 208, may interact with cloud infrastructure system 202 by requesting one or more services provided by cloud infrastructure system 202 and placing an order for a subscription for one or more services offered by cloud infrastructure system 202. In certain embodiments, the customer may access a cloud User Interface (UI), cloud UI 212, cloud UI 214 and/or cloud UI 216 and place a subscription order via these UIs. The order information received by cloud infrastructure system 202 in response to the customer placing an order may include information identifying the customer and one or more services offered by the cloud infrastructure system 202 that the customer intends to subscribe to.

After an order has been placed by the customer, the order information is received via the cloud UIs, 212, 214 and/or 216.

At operation 236, the order is stored in order database 218. Order database 218 can be one of several databases operated by cloud infrastructure system 218 and operated in conjunction with other system elements.

At operation 238, the order information is forwarded to an order management module 220. In some instances, order management module 220 may be configured to perform billing and accounting functions related to the order, such as verifying the order, and upon verification, booking the order.

At operation 240, information regarding the order is communicated to an order orchestration module 222. Order orchestration module 222 may utilize the order information to orchestrate the provisioning of services and resources for the order placed by the customer. In some instances, order orchestration module 222 may orchestrate the provisioning of resources to support the subscribed services using the services of order provisioning module 224.

In certain embodiments, order orchestration module 222 enables the management of business processes associated with each order and applies business logic to determine whether an order should proceed to provisioning. At operation 242, upon receiving an order for a new subscription, order orchestration module 222 sends a request to order provisioning module 224 to allocate resources and configure those resources needed to fulfill the subscription order. Order provisioning module 224 enables the allocation of resources for the services ordered by the customer. Order provisioning module 224 provides a level of abstraction between the cloud services provided by cloud infrastructure system 200 and the physical implementation layer that is used to provision the resources for providing the requested services. Order orchestration module 222 may thus be isolated from implementation details, such as whether or not services and resources are actually provisioned on the fly or pre-provisioned and only allocated/assigned upon request.

At operation 244, once the services and resources are provisioned, a notification of the provided service may be sent to customers on client devices 204, 206 and/or 208 by order provisioning module 224 of cloud infrastructure system 202.

At operation 246, the customer's subscription order may be managed and tracked by an order management and monitoring module 226. In some instances, order management and monitoring module 226 may be configured to collect usage statistics for the services in the subscription order, such as the amount of storage used, the amount data transferred, the number of users, and the amount of system up time and system down time.

In certain embodiments, cloud infrastructure system 200 may include an identity management module 228. Identity management module 228 may be configured to provide identity services, such as access management and authorization services in cloud infrastructure system 200. In some embodiments, identity management module 228 may control information about customers who wish to utilize the services provided by cloud infrastructure system 202. Such information can include information that authenticates the identities of such customers and information that describes which actions those customers are authorized to perform relative to various system resources (e.g., files, directories, applications, communication ports, memory segments, etc.) Identity management module 228 may also include the management of descriptive information about each customer and about how and by whom that descriptive information can be accessed and modified.

Figure 3:
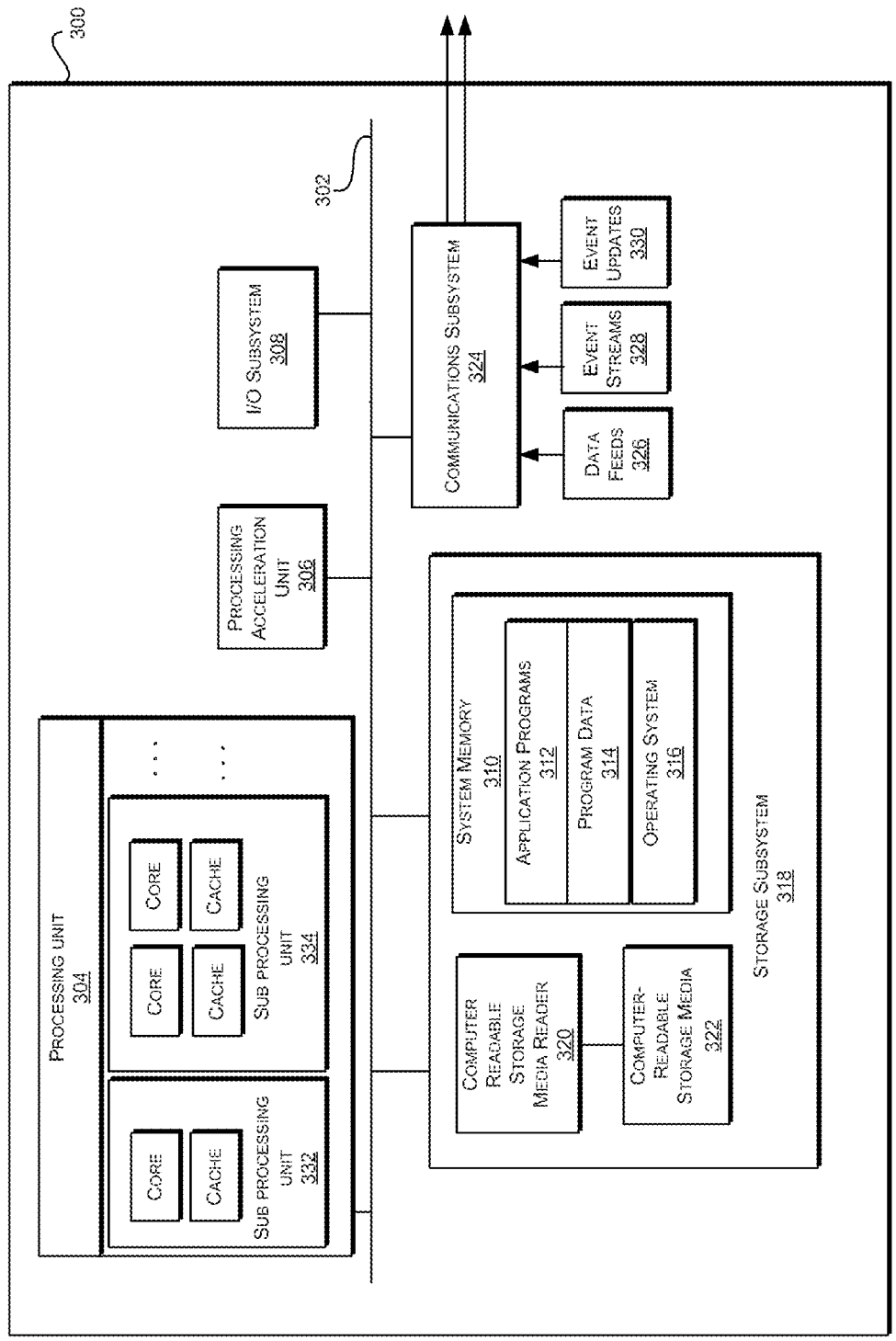
FIG. 3 is a block diagram illustrating an exemplary computer system in which embodiments of the present invention may be implemented.

FIG. 3 is a block diagram illustrating an exemplary computer system in which embodiments of the present invention may be implemented. The system 300 may be used to implement any of the computer systems described above. As shown in the figure, computer system 300 includes a processing unit 304 that communicates with a number of peripheral subsystems via a bus subsystem 302. These peripheral subsystems may include a processing acceleration unit 306, an I/O subsystem 308, a storage subsystem 318 and a communications subsystem 324. Storage subsystem 318 includes tangible computer-readable storage media 322 and a system memory 310.

Bus subsystem 302 provides a mechanism for letting the various components and subsystems of computer system 300 communicate with each other as intended. Although bus subsystem 302 is shown schematically as a single bus, alternative embodiments of the bus subsystem may utilize multiple buses. Bus subsystem 302 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 304, which can be implemented as one or more integrated circuits (e.g., a conventional microprocessor or microcontroller), controls the operation of computer system 300. One or more processors may be included in processing unit 304. These processors may include single core or multicore processors. In certain embodiments, processing unit 304 may be implemented as one or more independent processing units 332 and/or 334 with single or multicore processors included in each processing unit. In other embodiments, processing unit 304 may also be implemented as a quad-core processing unit formed by integrating two dual-core processors into a single chip.

In various embodiments, processing unit 304 can execute a variety of programs in response to program code and can maintain multiple concurrently executing programs or processes. At any given time, some or all of the program code to be executed can be resident in processor(s) 304 and/or in storage subsystem 318. Through suitable programming, processor(s) 304 can provide various functionalities described above. Computer system 300 may additionally include a processing acceleration unit 306, which can include a digital signal processor (DSP), a special-purpose processor, and/or the like.

I/O subsystem 308 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 300 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 300 may comprise a storage subsystem 318 that comprises software elements, shown as being currently located within a system memory 310. System memory 310 may store program instructions that are loadable and executable on processing unit 304, as well as data generated during the execution of these programs.

Depending on the configuration and type of computer system 300, system memory 310 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 304. In some implementations, system memory 310 may include multiple different types of memory, such as static random access memory (SRAM) or dynamic random access memory (DRAM). In some implementations, a basic input/output system (BIOS), containing the basic routines that help to transfer information between elements within computer system 300, such as during start-up, may typically be stored in the ROM. By way of example, and not limitation, system memory 310 also illustrates application programs 312, which may include client applications, Web browsers, mid-tier applications, relational database management systems (RDBMS), etc., program data 314, and an operating system 316. By way of example, operating system 316 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry®10 OS, and Palm® OS operating systems.

Storage subsystem 318 may also provide a tangible computer-readable storage medium for storing the basic programming and data constructs that provide the functionality of some embodiments. Software (programs, code modules, instructions) that when executed by a processor provide the functionality described above may be stored in storage subsystem 318. These software modules or instructions may be executed by processing unit 304. Storage subsystem 318 may also provide a repository for storing data used in accordance with the present invention.

Storage subsystem 300 may also include a computer-readable storage media reader 320 that can further be connected to computer-readable storage media 322. Together and, optionally, in combination with system memory 310, computer-readable storage media 322 may comprehensively represent remote, local, fixed, and/or removable storage devices plus storage media for temporarily and/or more permanently containing, storing, transmitting, and retrieving computer-readable information.

Computer-readable storage media 322 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 300.

By way of example, computer-readable storage media 322 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 322 may include, but is not limited to, Zip® drives, flash memory cards, universal serial bus (USB) flash drives, secure digital (SD) cards, DVD disks, digital video tape, and the like. Computer-readable storage media 322 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 300.

Communications subsystem 324 provides an interface to other computer systems and networks. Communications subsystem 324 serves as an interface for receiving data from and transmitting data to other systems from computer system 300. For example, communications subsystem 324 may enable computer system 300 to connect to one or more devices via the Internet. In some embodiments communications subsystem 324 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 324 can provide wired network connectivity (e.g., Ethernet) in addition to or instead of a wireless interface.

In some embodiments, communications subsystem 324 may also receive input communication in the form of structured and/or unstructured data feeds 326, event streams 328, event updates 330, and the like on behalf of one or more users who may use computer system 300.

By way of example, communications subsystem 324 may be configured to receive data feeds 326 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 324 may also be configured to receive data in the form of continuous data streams, which may include event streams 328 of real-time events and/or event updates 330, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 324 may also be configured to output the structured and/or unstructured data feeds 326, event streams 328, event updates 330, and the like to one or more databases that may be in communication with one or more streaming data source computers coupled to computer system 300.

Computer system 300 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 300 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Figure 4:
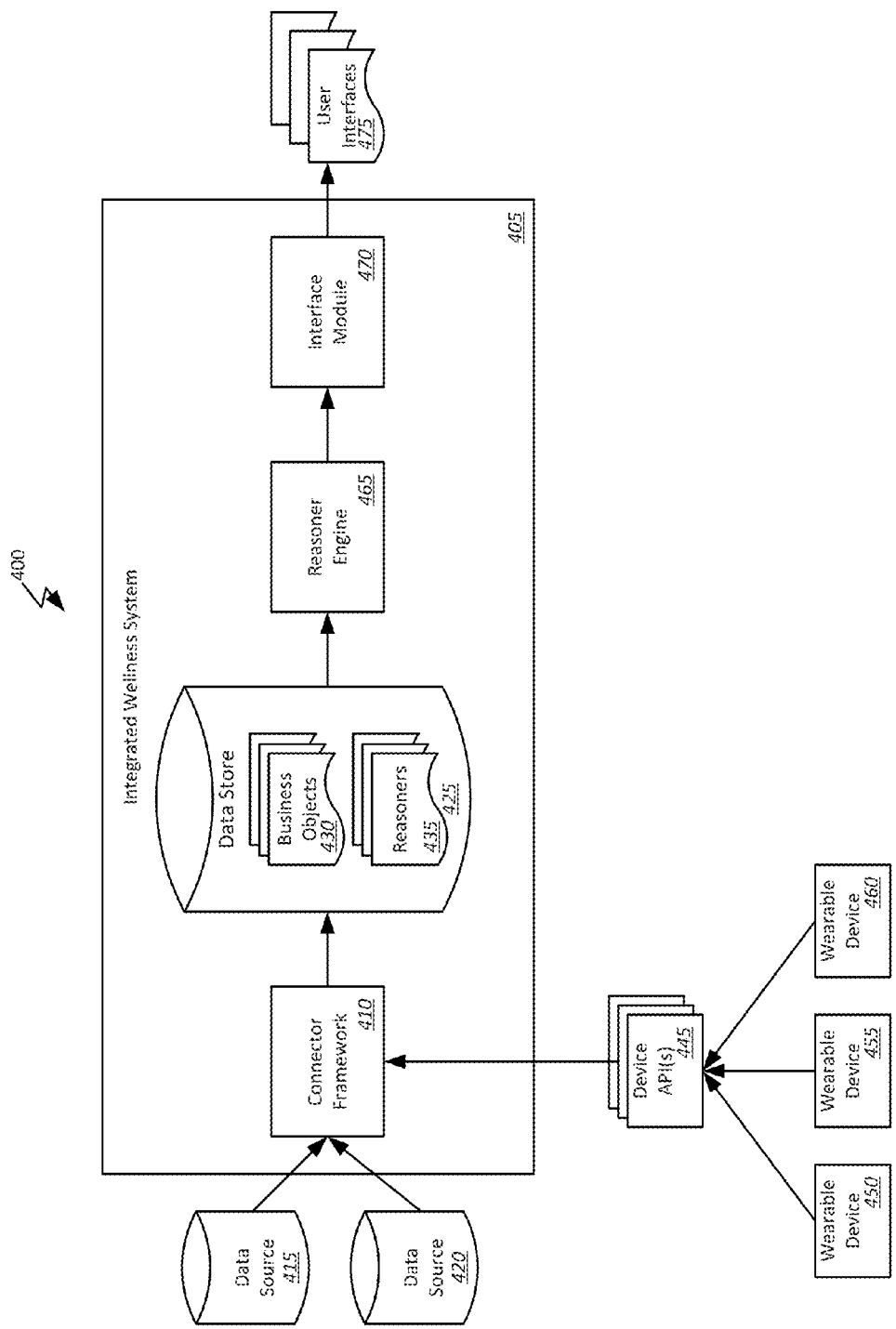
FIG. 4 is a block diagram illustrating, at a high-level, functional components of a system for providing wellness tracking and recommendations which integrate wearable devices with Human Resource (HR) and other enterprise application data according to one embodiment of the present invention.

FIG. 4 is a block diagram illustrating, at a high-level, functional components of a system for providing wellness tracking and recommendations which integrate wearable devices with Human Resource (HR) and other enterprise application data according to one embodiment of the present invention. As introduced above, embodiments of the invention provide a system 400 supporting wellness tracking and recommendations that synchronizes or integrates information from wearable devices 450, 455, and 460 with enterprise application data sources 415 and 420 such as a human capital management database, project management database or other enterprise application data to provide a full picture of health and wellness of a set of users such as employees of the enterprise. Wellness can be measured at the individual level as well as at the group level.

More specifically, the integrated wellness system 405 can connect to a company's enterprise systems to access the enterprise application data sources 415 and 420 including but not limited to HCM applications, project management applications, and other enterprise applications, via connectors 410 built to conform to a framework and can pull information from those sources 415 and 420 into a data store 425 such as a semantic database. It should be noted that, while illustrated here as being part of the integrated wellness system 405, the data store 425 may in various implementations be physically or logically located on one or more other systems (not shown here for the sake of clarity) accessible by the integrated wellness system 405. This data store 425 can be implemented, for example as a Resource Description Framework (RDF) data store 425 including business objects 430 and reasoners 435. The connectors 410 can also pull the data into the data store 425 from each employee's wearable device 450, 455, and 460, for example through a fitness tracker's cloud service (with the employee's permission) using the device manufacturer's cloud service device Application Program Interface (API) 445, e.g., the FitBit Java API. Regardless of how or where the data store 425 is located, the semantic database or other data store 425 can maintain information about employees' projects, their travel dates and locations, hours worked, etc.

The connector framework 410 pulls data from the various enterprise data sources 415 and 420 and wearable devices 450, 455, and 460 into the data store 425 to support our various calculations performed by the reasoner engine 465. For example, the reasoning engine can use Web Ontology Language (OWL) to define the business objects 430 and their relations and provide the reasoners 435 that allow for sophisticated semantic analysis of these objects 430. For example, an interface module 470 can use results of the analysis performed by the reasoner engine 465 to provide activity dashboards to the user though a set of web pages or other user interface 475. Through this user interface 475, an employee can see how active they are relative to other employees, the average person matching their age, gender, and profession, and so on. If the wearable device supports sleep tracking, dashboards may provide information about sleep habits and algorithms can provide recommendations on how much sleep to get. Various use-cases of such embodiments and exemplary user interfaces for these embodiments are described below with reference to FIGS. 6-15.

Figure 5:
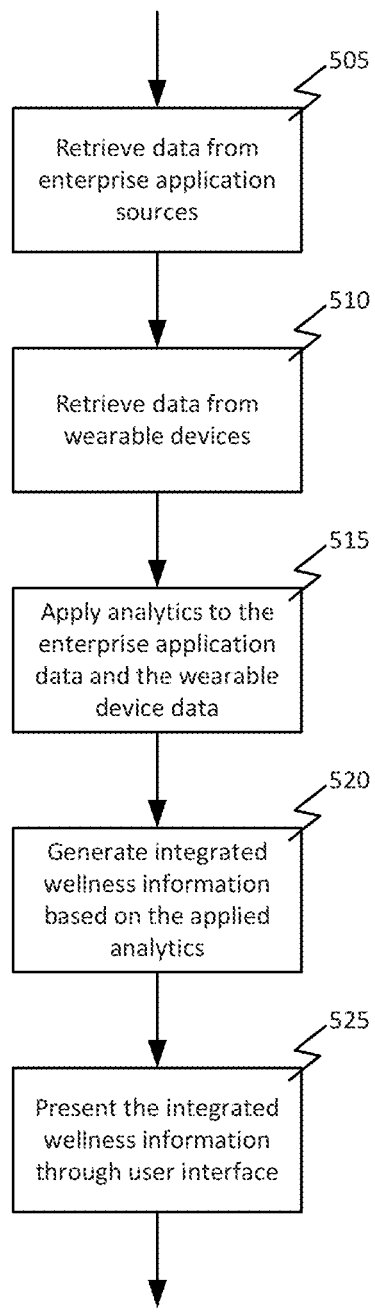
FIG. 5 is a flowchart illustrating a process for integrated wellness information according to one embodiment of the present invention.

FIG. 5 is a flowchart illustrating a process for integrated wellness information as may be performed by the integrated wellness system 405 according to one embodiment of the present invention. As illustrated in this example, providing integrated wellness information can comprise retrieving 505 enterprise application data from one or more data sources and retrieving 510 data from one or more wearable devices of one or more users. Analytics, e.g., in the form of reasoners as described above, can be applied 510 to the retrieved enterprise application data and the data retrieved from the wearable devices, e.g., based on one or more business objects as described above. The integrated wellness information can be generated 520 based on the applied analytics and the integrated wellness information can be provided 525 to the one or more users through a user interface such as one or more web pages.

As introduced above, the analytics applied 515, the integrated wellness information generated 520 and provided 525 to the user can vary according to different embodiments. For example, embodiments of the present invention can use the enterprise application data and wearable device data to provide activity dashboards including but are not limited to providing a measure of activity and fitness levels shown on a corporate leaderboard, providing a dashboard of most active and least active days of the week, provide a dashboard of "sedentary time" versus "active time," provide a dashboard measuring a "stress score" over some period of time with stress scores possibly shown as they relates to activity level and sleep patterns, provide anonymized comparisons against people of the same age, gender, region, BMI, job title, organization, project type(s), and salary range, provide customized recommendations for improvement, provide analysis of sleep patterns, including bed time, wake time, sleep duration, and sleep quality, provide a dashboard of quality of sleep per day, based on historical data, calculate sleep deficit and optimal bed times, provide a correlation model for sleep vs. stress level, activity level, caffeine consumption, etc., provide a correlation model for sleep quality versus project types, organization, job title, and job performance, and/or provide measures of stress score and sleep quality while traveling to different locations, etc. An integrated user interface provided by the application can present each of these use-cases to the user.

Examples of such an integrated user interface are provided and described below for illustrative purposes. However, it should be understood that the interfaces illustrated and described here are offered only by way of example and are not intended to limit the scope of the present invention. Rather, depending upon the exact implementation, the contents and format of the user interfaces can vary significantly without departing from the scope of the present invention.

Figure 6:
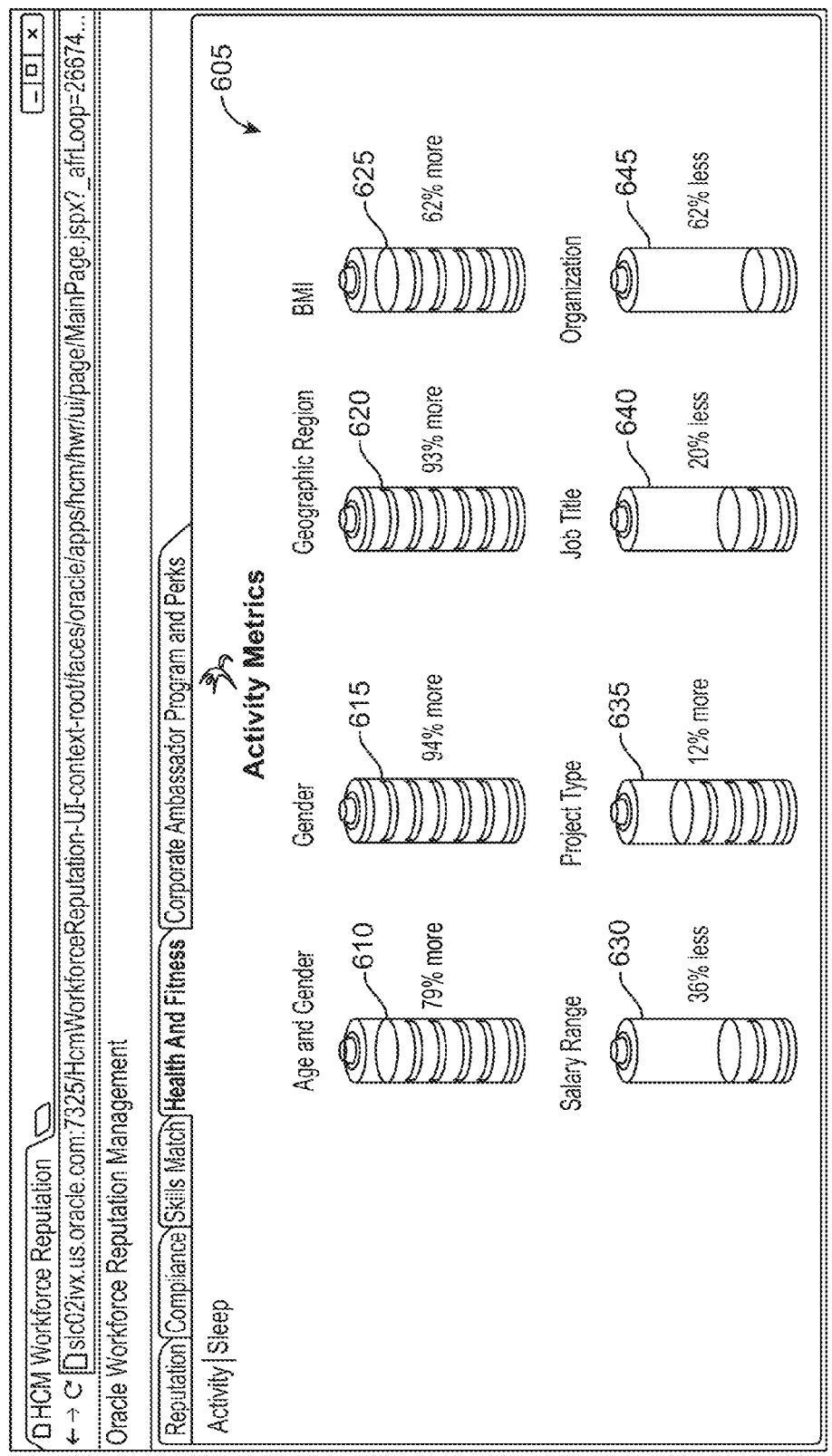
FIG. 6 is a screenshot illustrating an exemplary user interface for providing integrated activity level information according to one embodiment of the present invention.

FIG. 6 is a screenshot illustrating an exemplary user interface for providing integrated activity level information according to one embodiment of the present invention. This example illustrates a web page 605 or other interface for presenting comparative activity information. Activity levels can be calculated using data from the wearable devices including but not limited to the number of daily steps, time spent highly active, time spent moderately active, logged activities, calories burned, and distance traveled. This scenario enables users to make comparisons between their fitness level and others of the same age 610, gender 615, geographic location 620, and BMI 625. Embodiments can also correlate activity levels enterprise application data such as salary range 630, project type 635, job title 640, and organization 640. These comparisons can be done on a group level (e.g., organization, team, company) as well as on an individual level.

Figure 7:
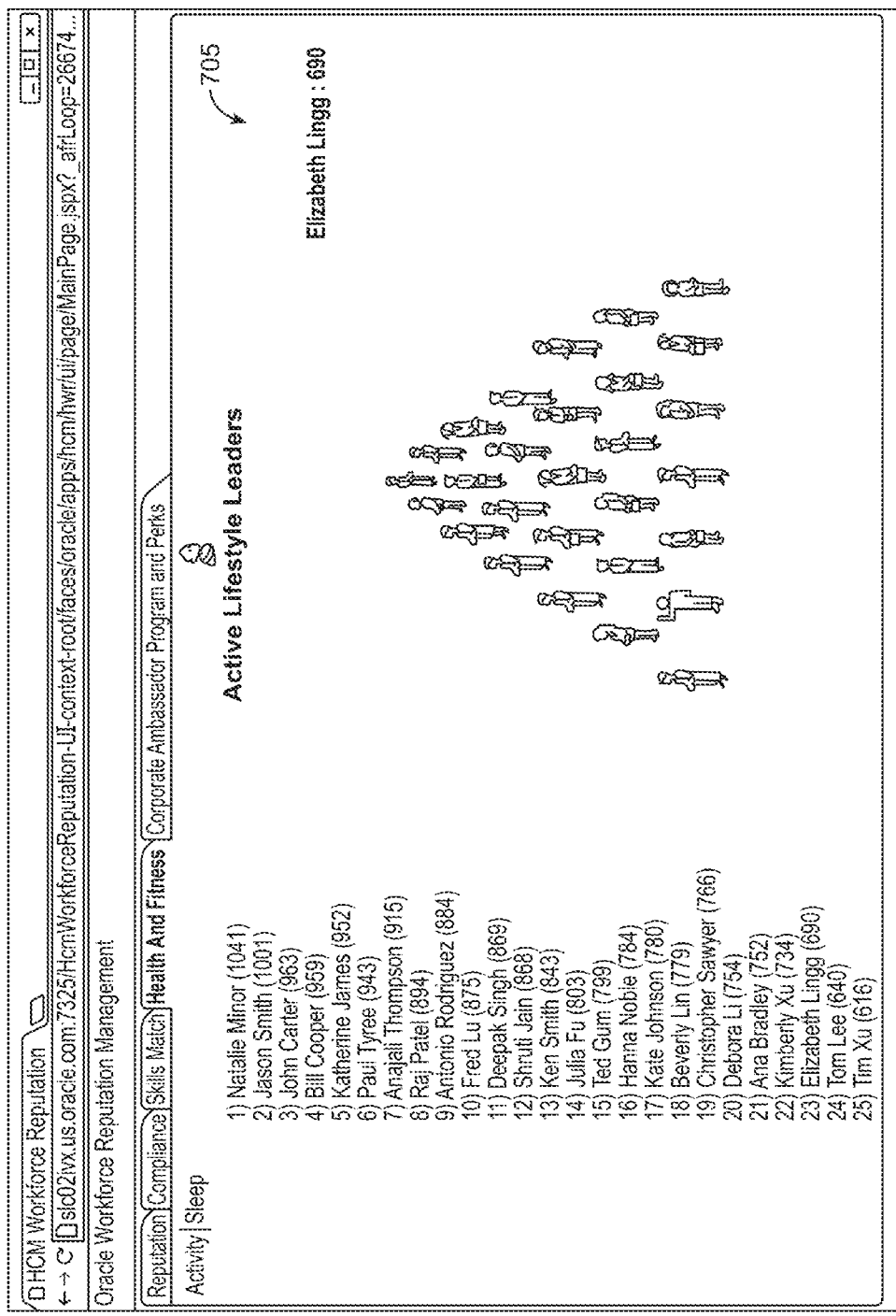
FIG. 7 is a screenshot illustrating an exemplary user interface for providing an activity level leader board according to one embodiment of the present invention.

FIG. 7 is a screenshot illustrating an exemplary user interface for providing an activity level leader board according to one embodiment of the present invention. This example illustrates a web page 705 or other interface for presenting an activity leader boards and comparative statistics to allow users to compete with one another. For instance, several different teams might have a competition or users might look at the company leader board to see how they compare to others at the company.

Figure 8:
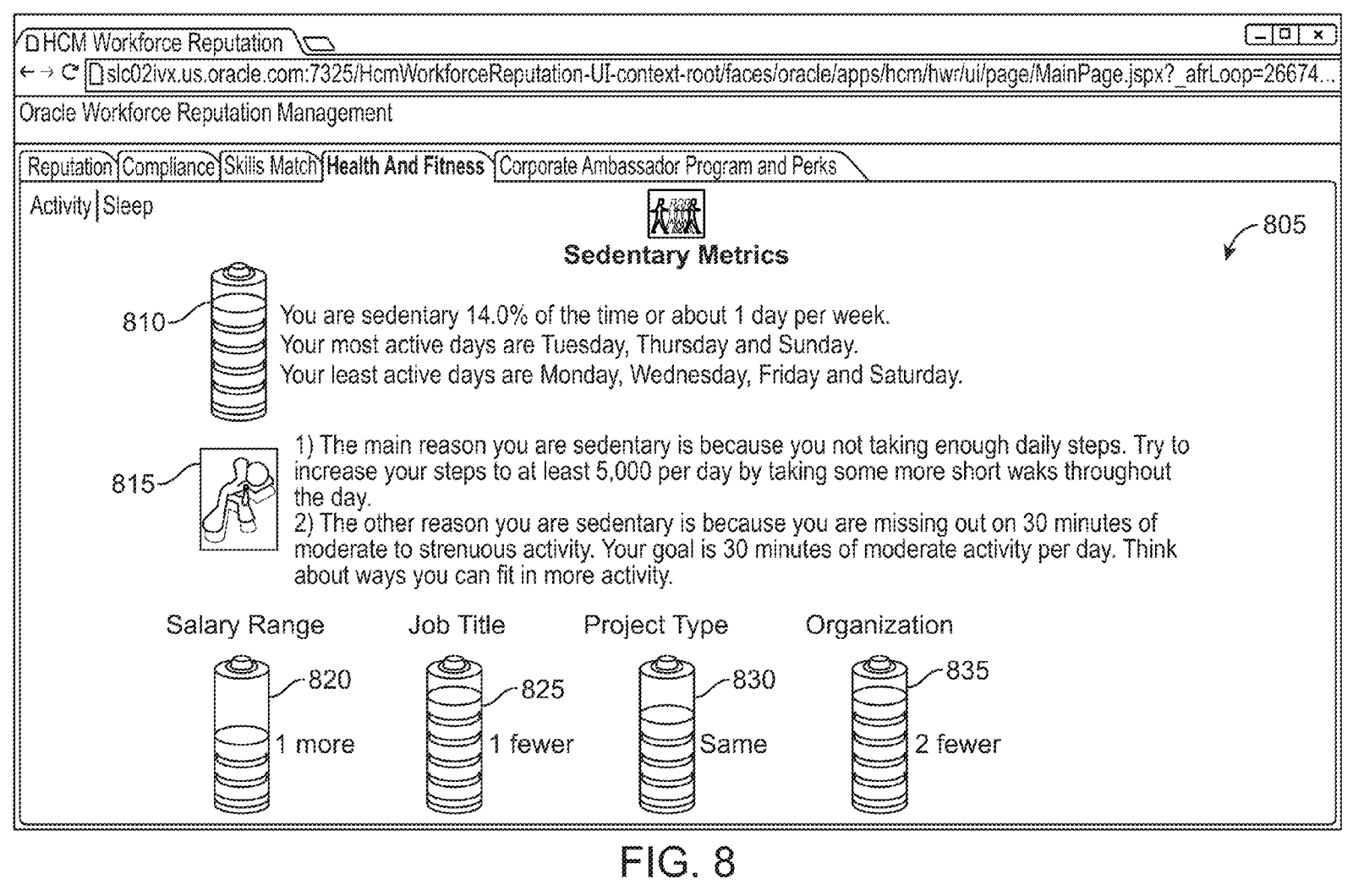

FIG. 8 is a screenshot illustrating an exemplary user interface for providing integrated sedentary lifestyle analysis information according to one embodiment of the present invention. This example illustrates a web page 805 or other interface for presenting a set of sedentary metrics, evaluations, and recommendations. For example, an individual can be considered to lead a sedentary lifestyle based on their calories burned, daily steps, time spent in moderate or vigorous activity, and distance moved. The analysis performed by embodiments of the present invention can use these parameters and can output a sedentary lifestyle score 810 for each day that a given user wears a fitness device.

Embodiments can calculate the percentage of time the user is sedentary and determine the most active days of the week/month and the least active days of the week/month. Embodiments can also calculate customized recommendations 815 to show how the user can improve. For example, some users may be sedentary due to lack of moderate or high levels of activity. Others may be sedentary due to a low number of daily steps. Embodiments can determine the specific reason that a given user is sedentary and output recommendations based on this.

In order to more fully evaluate the data related to sedentary lifestyle embodiments can look for and present correlations between users who are sedentary and their age, gender, geographic location, working hours, salary range 820, job title 825, occupation, project types 830, organization 835, and other HR criteria. Similar to the other scenarios, the data is analyzed at the individual and group level.

Figure 9:
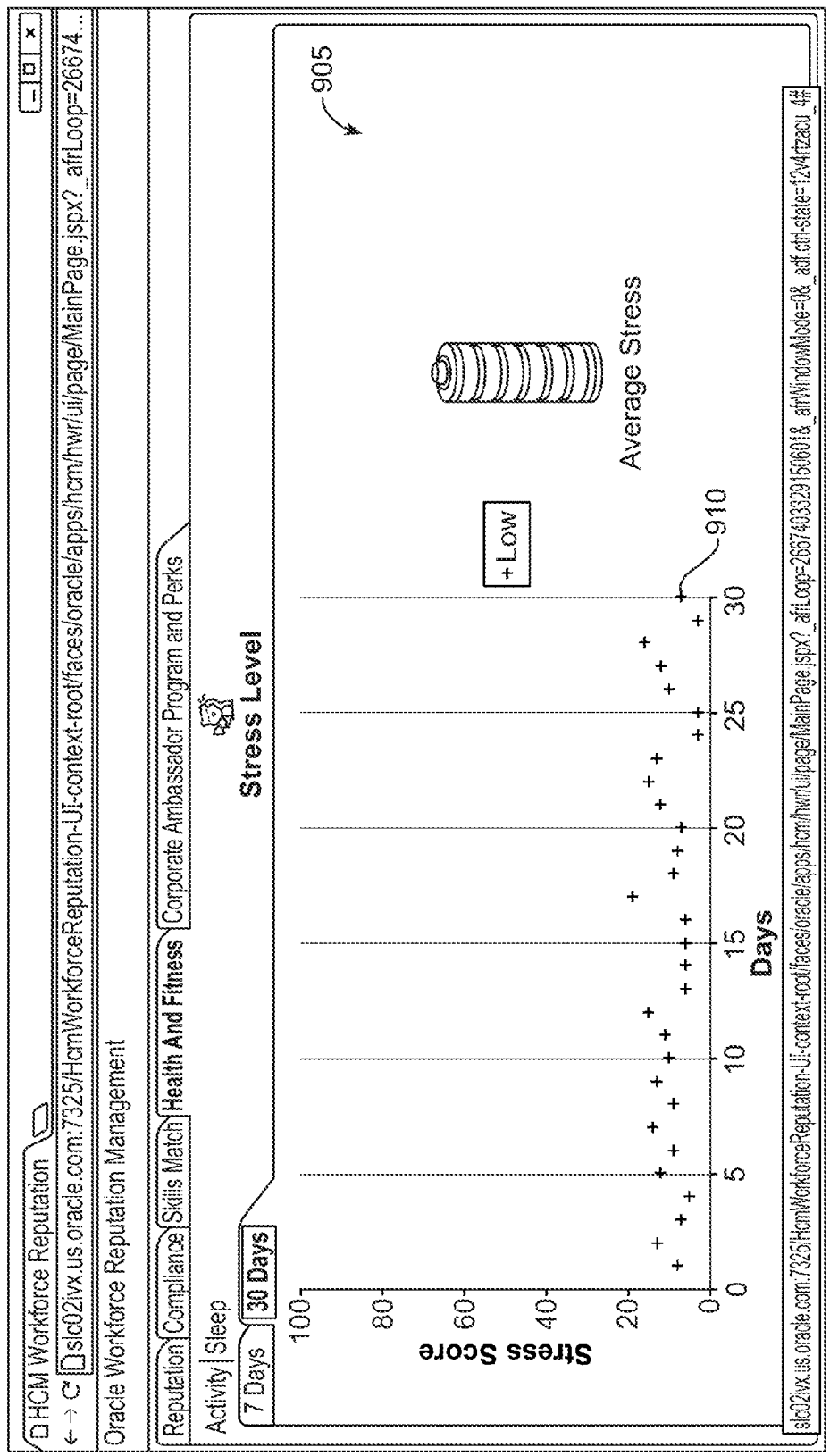
FIG. 9 is a screenshot illustrating an exemplary user interface for providing integrated stress analysis information according to one embodiment of the present invention.
Figure 10:
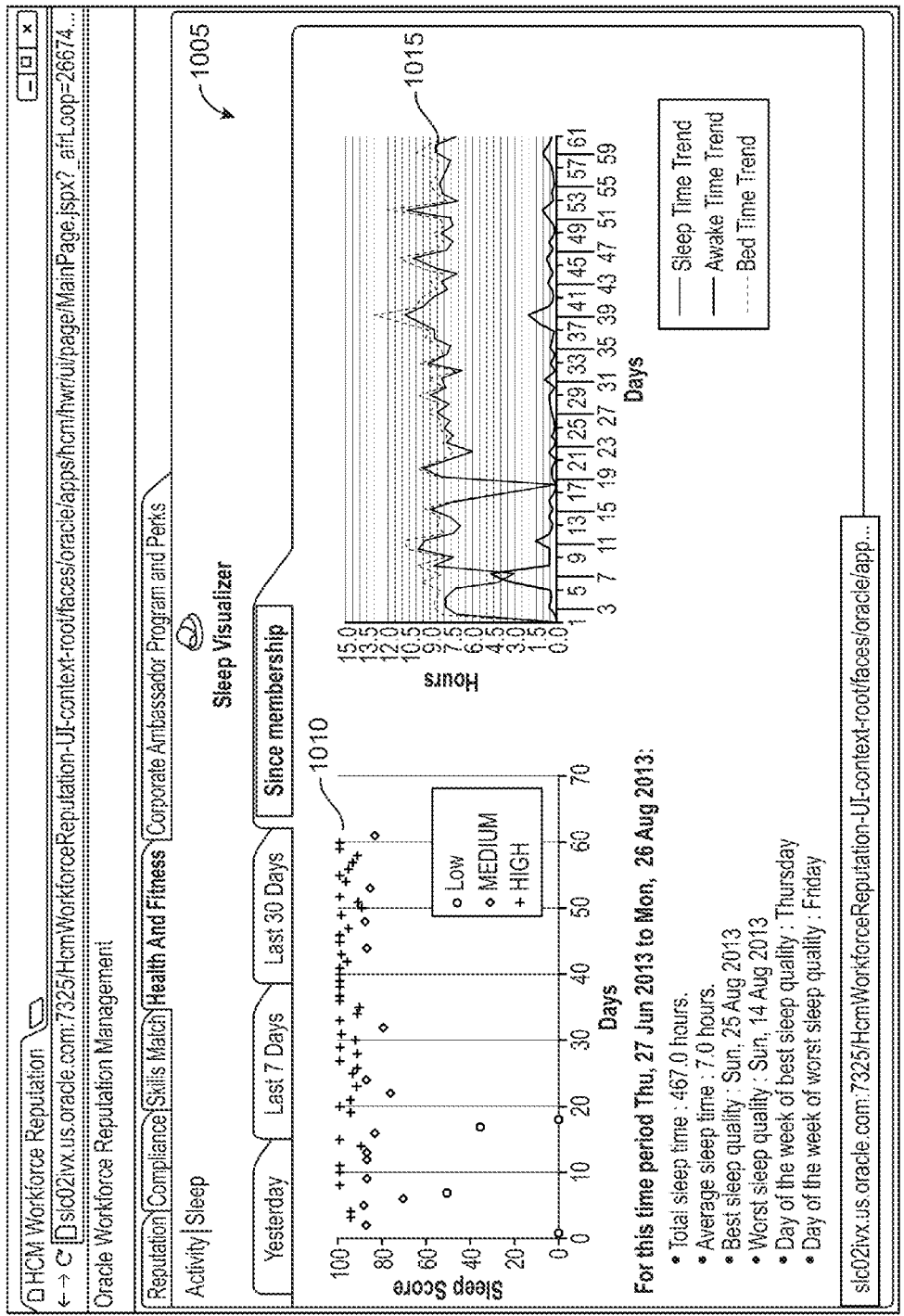
FIG. 10 is a screenshot illustrating an exemplary user interface for providing integrated sleep quality analysis information according to one embodiment of the present invention.

FIG. 9 is a screenshot illustrating an exemplary user interface for providing integrated stress analysis information according to one embodiment of the present invention. This example illustrates a web page 905 or other interface for presenting stress level calculations. The stress level algorithm can output a score 910 for stress level based on industry research. It can use heart rate, pulse, activity levels, sleeplessness, and awakenings during sleep to provide a stress level score. The stress level can be calculated on a score, e.g., from 0 to 100 with 0 being the lowest level of stress and 100 being the highest level of stress. A low stress level might be, for example, in the range 0 to 39, medium stress might be in the range 40-60, and a high level of stress might be in the range 61-100. Users' stress levels can be analyzed over time and correlations are made between stress level and personal data/other HR data to get a fuller picture of health and wellness FIG. 10 is a screenshot illustrating an exemplary user interface for providing integrated sleep quality analysis information according to one embodiment of the present invention. This example illustrates a web page 1005 or other interface for presenting sleep quality calculations. For example, the application can calculate each user's sleep quality and displays the trends 1015 for the user. Visualizing time in bed, time slept, and the time they wake up makes it very easy for users to track their sleep. The sleep quality can be measured by sleep score 1010, for example, on a scale of 0 to 100. The sleep score can be calculated using data including overall sleep time, time to fall asleep, bed time, sleep efficiency, and the total numbers of times the person woke up at night. For example, if the sleep score is greater than or equal to 90, the sleep quality might be considered high, if it is lower than 70, the quality might be considered poor and the application can display a warning to the user, and if the sleep score is between 70 and 90, the quality might be considered medium. Embodiments can compare sleep quality across week days and provides data by outputting the days of the week with best sleep quality as well as the days of the week with the worst sleep quality.

FIG. 11 is a screenshot illustrating an exemplary user interface for providing a bedtime calculator according to one embodiment of the present invention. This example illustrates a web page 1105 or other interface for presenting an optimal bed time calculator, i.e., a best time of day to go to sleep for a particular user. According to one embodiment, this tool can first compute the sleep deficit 1110 over the last seven days based on the recommended amount of sleep the user needs. Next, the user can enter the time 1120 that they would like to wake up and the duration of time 1115 they want to sleep. The application can then calculate the best bedtime 1120 using the following logic: if, it is the weekend, the tool can compensate for 25% of the user's sleep deficit over the last 7 days; predict the user's total time in bed using the sleep duration and the sleep efficiency as well as the time it typically takes the user to fall asleep; and calculate the time to go to bed given the above information.

Figure 12:
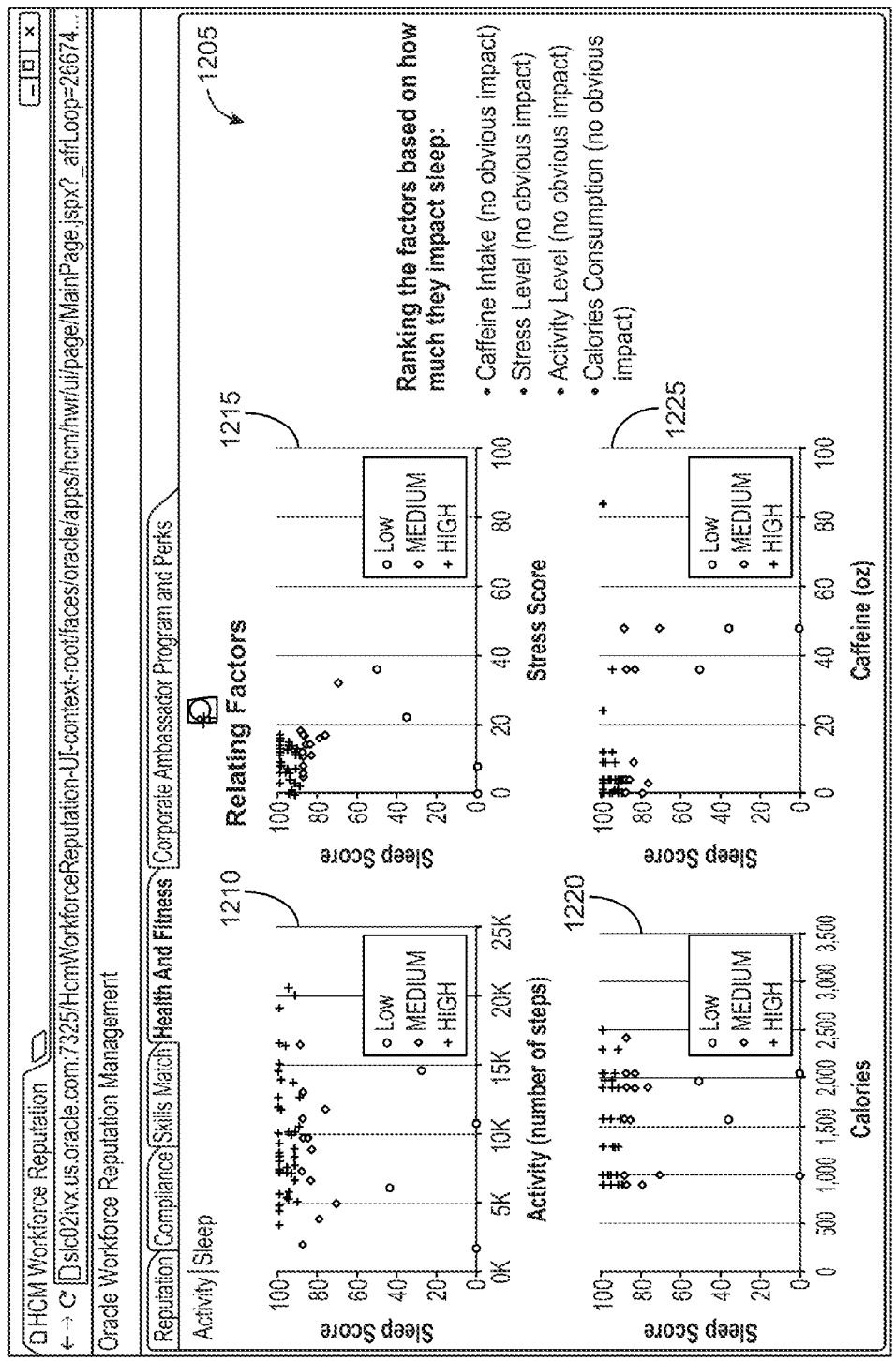
FIG. 12 is a screenshot illustrating an exemplary user interface for providing integrated information correlating factors with sleep according to one embodiment of the present invention.

FIG. 12 is a screenshot illustrating an exemplary user interface for providing integrated information correlating factors with sleep according to one embodiment of the present invention. This example illustrates a web page 1205 or other interface for presenting sleep quality scores correlated to factors impacting sleep. Embodiments can analyze the different factors that affect the users' sleep. Some of these factors include stress level, calories consumed, activity level, and caffeine intake. The analysis finds the strong or weak correlation between sleep and these factors by calculating the correlation coefficient and presenting these on charts or graphs 1210, 1215, 1220, and 1225 illustrating the correlations for each factor.

Figure 13:
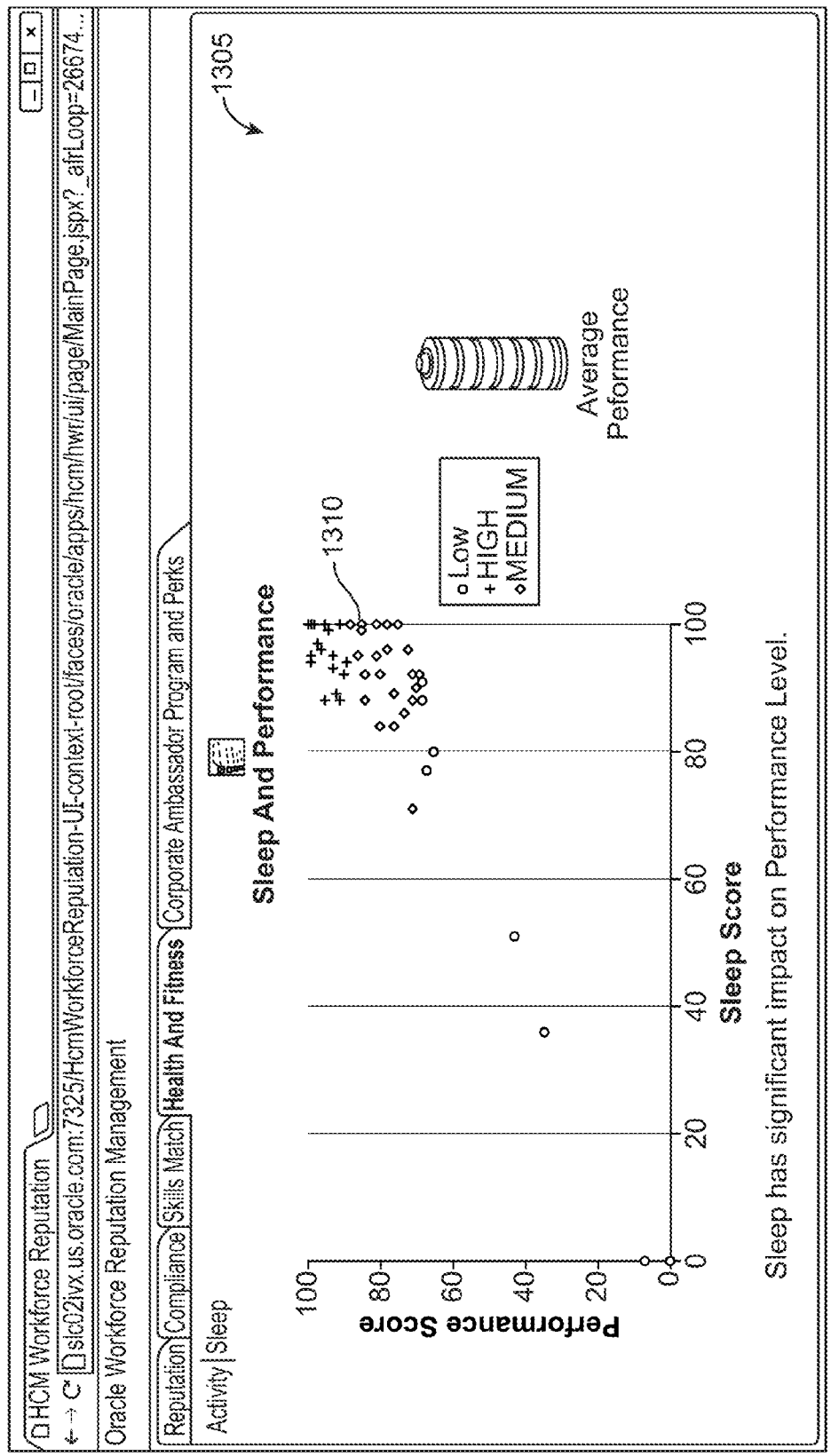
FIG. 13 is a screenshot illustrating an exemplary user interface for providing integrated information correlating sleep with performance according to one embodiment of the present invention.

FIG. 13 is a screenshot illustrating an exemplary user interface for providing integrated information correlating sleep with performance according to one embodiment of the present invention. This example illustrates a web page 1305 or other interface for presenting correlations 1310 between sleep and the employees' performance. This can be offered as an individual and manager view, which can help management gain insights about improving employees' performance and perhaps improve with active coaching.

FIG. 14 is a screenshot illustrating an exemplary user interface for providing a project comparator in relation to sleep according to one embodiment of the present invention. This example illustrates a web page 1405 or other interface for presenting sleep quality metrics 1410 and 1415 for an employee categorized by different project types 1420 so that management can gain insights on employees' behavior and make adjustments when assigning projects. This can also help the individual determine which projects impact their sleep patterns.

Figure 15:
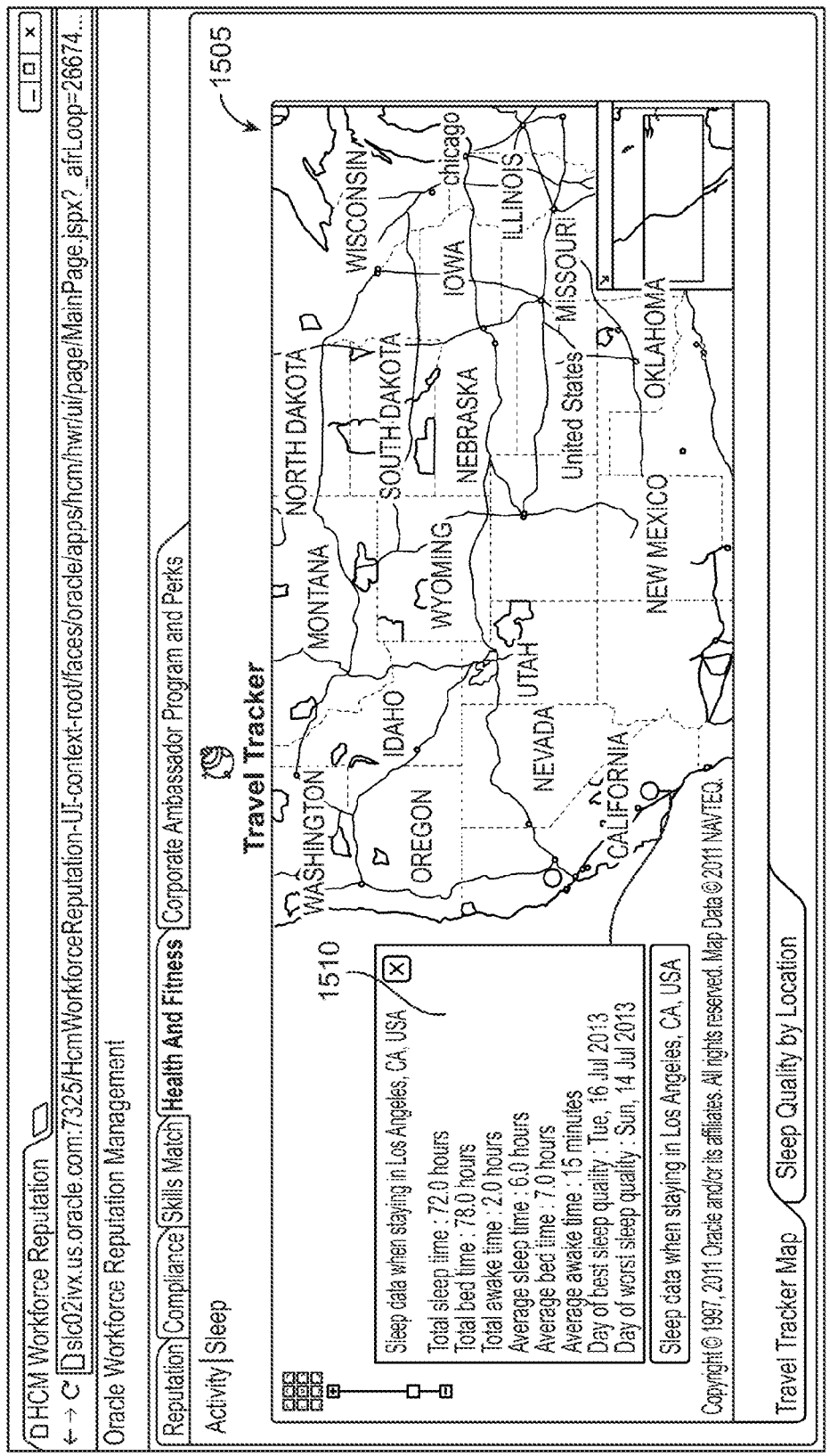
FIG. 15 is a screenshot illustrating an exemplary user interface for providing a travel tracker with sleep information according to one embodiment of the present invention.

FIG. 15 is a screenshot illustrating an exemplary user interface for providing a travel tracker with sleep information according to one embodiment of the present invention. This example illustrates a web page 1505 or other interface for presenting sleep metrics 1510 categorized by location. Here the employee can track and view their sleep quality at different locations that he/she has traveled to. The tool can analyze the sleep data and provides information for both individuals and managers. For the manager view, data may be shown anonymously. The sleep data can be ranked, with the place where the individual had the best quality sleep first, followed by the place of the second best quality, etc. Ranking can be done overall and also by the day of the week so the user can see where they sleep best on a Monday, for example.

It should be understood that the processes described above and illustrated with reference to the exemplary user interfaces are not exclusive and can be used in various combinations with each other and similar additional processes and interfaces. For example and according to one embodiment, generating the integrated wellness information presented in these various interfaces and based on the applied analytics can comprise generating one or more work-life balance and wellness metrics relative to a set of user defined goals and one or more recommendations to achieve the user defined goals. Additionally or alternatively, generating the integrated wellness information based on the applied analytics can comprise generating one or more wellness metrics relative to a set of organization defined wellness goals of a wellness program and one or more recommendations to achieve the organization defined wellness goals. In either case, the metrics and recommendations relative to user defined or organization defined goals can be inclusive of any of the factors described above such as activity level, sedentary metrics, stress level, sleep quality, etc. and may incorporate and/or be presented as part of the interfaces described above related to such metrics and recommendations. Other variations and combinations are contemplated and considered to be within the scope of the present invention.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums or memory devices, such as CD-ROMs or other type of optical disks, floppy diskettes, ROMs, RAMs, EPROMs, EEPROMs, magnetic or optical cards, flash memory, or other types of machine-readable mediums or memory devices suitable for storing electronic instructions. Alternatively, the methods may be performed by a combination of hardware and software.

While illustrative and presently preferred embodiments of the invention have been described in detail herein, it is to be understood that the inventive concepts may be otherwise variously embodied and employed, and that the appended claims are intended to be construed to include such variations, except as limited by the prior art.

What is claimed is:

1. A method comprising:
   retrieving, by a computer system, enterprise application data from one or more data sources of an enterprise, the one or more data sources storing data for a set of employees of the enterprise;
   retrieving, by the computer system, data from one or more wearable devices of the set of employees;
   applying, by the computer system, analytics to the retrieved enterprise application data and the data retrieved from the one or more wearable devices to generate wellness information, wherein the wellness information includes:
      a sedentary metric for a first employee from the set of employees, the sedentary metric indicative of a percentage of time of a period of time that the first employee was determined to be sedentary;
      a sedentary score for the first employee for the period of time; and
      information identifying a reason associated with the sedentary score and a related recommendation customized for the first employee;
   outputting, by the computer system, the wellness information through a user interface;
   calculating one or more scores for a sleep quality of the first employee using the data retrieved from the one or more wearable devices; and
   analyzing the sedentary score of the first employee and determining a correlation between the one or more sleep quality scores of the first employee and the sedentary score of the first employee.

2. The method of claim 1, wherein the wellness information further includes information comparing activity level information for the first employee with activity level information for other employees in the set of employees.

3. The method of claim 1, wherein the wellness information further includes sleep quality information for the first employee.

4. The method of claim 1, wherein the wellness information further includes information correlating the one or more sleep quality scores for the first employee to one or more factors related to the first employee that impact the sleep quality score.

5. The method of claim 1, wherein the wellness information further includes information correlating a set of sleep scores and a set of performance scores for the first employee.

6. The method of claim 1, wherein the wellness information further includes a set of sleep quality metrics for the set of employees categorized by project types or occupations.

7. The method of claim 1, wherein the wellness information further includes a set of sleep metrics categorized by location for the first employee.

8. The method of claim 1, wherein the wellness information further includes one or more work-life balance and wellness metrics relative to a set of user defined goals for the first employee and one or more recommendations to achieve the user defined goals for the first employee.

9. The method of claim 1, wherein the wellness information further includes one or more wellness metrics for the first employee relative to a set of organization defined wellness goals of a wellness program and one or more recommendations for the first employee to achieve the organization defined wellness goals.

10. A system comprising:
a processor; and
a memory coupled with and readable by the processor and storing therein a set of instructions which, when executed by the processor, causes the processor to:
retrieve enterprise application data from one or more data sources of an enterprise, the one or more data sources storing data for a set of employees of the enterprise;
retrieve data from one or more wearable devices of the set of employees;
apply analytics to the retrieved enterprise application data and the data retrieved from the one or more wearable devices to generate wellness information, wherein the wellness information includes:
a sedentary metric for a first employee from the set of employees, the sedentary metric indicative of a percentage of time of a period of time that the first employee was determined to be sedentary;
a sedentary score for the first employee for the period of time; and
information identifying a reason associated with the sedentary score and a related recommendation customized for the first employee;
output the wellness information through a user interface;
calculate one or more scores for a sleep quality of the first employee using the data retrieved from the one or more wearable devices; and
analyze the sedentary score of the first employee and determining a correlation between the one or more sleep quality scores of the first employee and the sedentary score of the first employee.

11. The system of claim 10, wherein the wellness information further includes information comparing activity level information for the first employee with activity level information for other employees in the set of employees.

12. The system of claim 10, wherein the wellness information further includes one or more of: sleep quality information for the first employee; information correlating the one or more sleep quality scores for the first employee to one or more factors related to the first employee that impact the one or more sleep quality scores; information correlating a set of sleep scores and a set of performance scores for the first employee; a set of sleep quality metrics for the set of employees categorized by project types or occupations; and a set of sleep metrics categorized by location for the first employee.

13. The system of claim 10, wherein wellness information further includes one or more of: one or more work-life balance and wellness metrics relative to a set of user defined goals for the first employee; one or more recommendations to achieve the user defined goals for the first employee; one or more wellness metrics for the first employee relative to a set of organization defined wellness goals of a wellness program; and one or more recommendations for the first employee to achieve the organization defined wellness goals.

14. A computer-readable memory comprising a set of instructions stored therein which, when executed by a processor, causes the processor to:
retrieve enterprise application data from one or more data sources of an enterprise, the one or more data sources storing data for a set of employees of the enterprise;
retrieve data from one or more wearable devices of the set of employees;
apply analytics to the retrieved enterprise application data and the data retrieved from the one or more wearable devices to generate wellness information, wherein the wellness information includes:
a sedentary metric for a first employee from the set of employees, the sedentary metric indicative of a percentage of time of a period of time that the first employee was determined to be sedentary;
a sedentary score for the first employee for the period of time; and
information identifying a reason associated with the sedentary score and a related recommendation customized for the first employee;
output the wellness information through a user interface;
calculate one or more scores for a sleep quality of the first employee using the data retrieved from the one or more wearable devices; and
analyze the sedentary score of the first employee and determining a correlation between the one or more sleep quality scores of the first employee and the sedentary score of the first employee.

15. The computer-readable memory of claim 14, wherein the wellness information further includes information comparing activity level information for the first employee with activity level information for other employees in the set of employees.

16. The computer-readable memory of claim 14, wherein the wellness information further includes one or more of: sleep quality information for the first employee; information correlating the one or more sleep quality scores for the first employee to one or more factors related to the first employee that impact the one or more sleep quality scores; information correlating a set of sleep scores and a set of performance scores for the first employee; and a set of sleep quality metrics for the set of employees categorized by project types or occupations; and a set of sleep metrics categorized by location for the first employee.

17. The computer-readable memory of claim 14, wherein the wellness information further includes one or more of: one or more work-life balance and wellness metrics for the first employee relative to a set of user defined goals for the first employee; one or more recommendations for the first employee to achieve the user defined goals for the first employee; one or more wellness metrics for the first employee relative to a set of organization defined wellness goals of a wellness program; and one or more recommendations for the first employee to achieve the organization defined wellness goals.

18. The method of claim 1, further comprising:
   identifying one or more days in the period of time that the first employee was determined to be sedentary; and
   determining, using the identified one or more days, a reason that the first employee was determined to be sedentary, wherein the related recommendation customized for the first employee included in the wellness information is based on the determined reason.

19. The method of claim 1, wherein the retrieved enterprise application data includes, for each employee of the set of employees, at least one of an age, a gender, a geographic location, working hours, a salary range, a job title, an occupation, one or more project types, or an organization.

* * * * *